(12) United States Patent
Peng et al.

(10) Patent No.: US 6,703,332 B2
(45) Date of Patent: Mar. 9, 2004

(54) GLASS-CERAMIC FOR SUBSTRATE OF MAGNETIC DISK HAVING HIGHER STRENGTH AND PROCESS FOR THE PRODUCTION OF THE SAME

(75) Inventors: Bo Peng, Xiangfan (CN); Shaolin Huang, Xiangfan (CN); Zusheng Zhan, Xiangfan (CN); Youming Cao, Xiangfan (CN)

(73) Assignee: Hubei New Huanguang New Information Materials Co., Ltd., Xiangfan (CN)

( * ) Notice: Subject to any disclaimer, the term of this patent is extended or adjusted under 35 U.S.C. 154(b) by 294 days.

(21) Appl. No.: 09/859,036

(22) Filed: May 16, 2001

(65) Prior Publication Data

US 2002/0009600 A1 Jan. 24, 2002

(51) Int. Cl.$^7$ .......................... C03C 10/04; C03C 19/00
(52) U.S. Cl. ............... 501/5; 428/694 ST; 428/694 SG; 65/33.8; 65/61
(58) Field of Search .................. 501/5; 428/694 ST, 428/694 SG; 65/33.8, 61

(56) References Cited

U.S. PATENT DOCUMENTS

| | | | |
|---|---|---|---|
| 5,391,522 A | 2/1995 | Goto et al. ................ 501/4 |
| 5,561,089 A | 10/1996 | Ishizaki et al. ............ 501/10 |
| 5,567,217 A | 10/1996 | Goto et al. ............... 65/33.1 |
| 5,626,935 A | 5/1997 | Goto et al. ............... 428/64.1 |
| 5,691,256 A | 11/1997 | Taguchi et al. ............ 501/63 |
| 5,726,108 A | 3/1998 | Taguchi et al. ............ 501/5 |
| 6,387,509 B1 * | 5/2002 | Goto et al. ............... 428/426 |
| 6,458,728 B1 * | 10/2002 | Nagata et al. ............. 501/4 |
| 6,514,890 B1 * | 2/2003 | Nagata et al. ............. 501/4 |
| 6,524,982 B1 * | 2/2003 | Nagata et al. ............. 501/4 |
| 2001/0056021 A1 * | 12/2001 | Nagata et al. | |

FOREIGN PATENT DOCUMENTS

| JP | 200169184 | * | 6/2000 |
|---|---|---|---|
| JP | 2000-169186 | | 6/2000 |

* cited by examiner

Primary Examiner—Karl Group

(57) ABSTRACT

A glass-ceramic for substrate of magnetic disks having high strength can be obtained by subjecting to heat treatment a base glass comprising, in terms of weight percent of their oxides, from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$, and the glass-ceramic comprises $Li_2O \cdot 2SiO_2$ as the main crystal phase. The glass-ceramic has a bending strength of 230–360 Mpa and a surface roughness of less than 10 Angstroms after final polishing, and is thus suitable for use as substrate of magnetic disk. A process for producing the glass-ceramic is also provided.

8 Claims, No Drawings

GLASS-CERAMIC FOR SUBSTRATE OF MAGNETIC DISK HAVING HIGHER STRENGTH AND PROCESS FOR THE PRODUCTION OF THE SAME

FIELD OF THE INVENTION

The present invention relates to a novel material for substrate of magnetic disks widely used in various kinds of computers, in particular to a glass-ceramic material, and a process for producing the same.

BACKGROUND OF THE INVENTION

In recent years, with the development of magnetic head and magnetic recording layer technology, great improvements for high-density recording and high-speed reading/writing have been achieved, and the demands for better performances of disk substrates are becoming stronger.

In order to increase the recording density of a magnetic disk, the bit density and track density of the magnetic disk have to be increased. This makes the magnetic head become further closer to the disk surface. In this connection, an amount of the head floating from the magnetic disk is decreased to the order of 0.025 microns, so that the surface roughness of the magnetic disk should be 10 Angstroms or less and the disk surface should be very resistive to wear in order to withstand the contact with the magnetic head.

The capability of high-speed of reading/writing currently renders hard disks as a very important device widely used for the purpose of memory and the like. With evolvement of higher density of recording and faster speed for information handling of CPU and the like of a computer, there exist a requirement to correspondingly increase the reading/writing speed of a hard disk, and consequently to increase the rotary speed of the disk. At the present time, a hard disk with a rotary speed of ten thousands revolutions per minute or higher has been market available, and such a high rotary speed inevitably demand a disk substrate with better mechanical properties.

Aluminum alloys have heretofore been used for magnetic disc substrate, but the aluminum alloy substrate tends to give a surface roughness of substantially higher than 10 Angstroms by a polishing process. Furthermore, it is necessary to increase the thickness of disk substrate so as to prevent it from deformation due to the fact that aluminum alloys are soft materials. As a result, an aluminum alloy is insufficient to satisfy the recent requirements for a hard disk substrate.

In order to overcome the defects inherent in aluminum alloys, chemically strengthened glass has been proposed to give a substrate with high hardness, high elastic modulus, small deformation and excellent in surface smoothness after processing. Despite of these, chemically strengthened glass normally has certain amount of alkali components such as $Na^+$ in its matrix, and the alkali components may adversely affect the magnetic recording layer during the process of producing the same due to alkali migration into the magnetic recording layer. As a result a barrier layer must be applied onto the substrate before applying the magnetic recording layer, which adds to the production cost. In addition, current hard disks tend to be small-sized and thus require the substrate be thinner; however, chemically strengthened glass is instable in the strengthened layer when thinning of the disk is intended. In an attempt to provide a glass substrate for magnetic disks, U.S. Pat. No. 5,691,256 disclosed a glass composition for magnetic disk substrates, which demonstrated improvement properties after subjected to chemically strengthening by ion exchange of the glass or crystallizing the glass by heat-treatment. Although the resulting materials showed an overall improved performance, the composition still contained a substantially amount of alkali components, and the mechanical properties could be further enhanced.

Glass-ceramic has been known in the art to be used for disk substrates as to alleviate the drawbacks of the aluminum alloy substrates and the chemically strengthened glass substrates. Various glass-ceramic compositions have been proposed. For example, all the glass-ceramic systems disclosed in U.S. Pat. Nos. 5,391,522, 5,567,217 and 5,626,935 contain lithium disilicate ($Li_2O \cdot 2SiO_2$) and alpha-quartz as their main crystal phases. However, these glass-ceramics are inferior due to the fact that surface roughness (Ra) after polishing is a relative large value (i.e. 15–50 Angstroms) and doesn't satisfy the new requirement on the surface roughness of a substrate for magnetic disk (i.e. less than 10 Angstroms). Besides, the mechanical property of these glass-ceramics is not very good and needs to be further improved so as to satisfy the increasing requirements on the mechanical property of the substrate of magnetic disk.

Glass-ceramics intended for use as substrates of magnetic disks comprising a main crystal phase other than lithium disilicate ($Li_2O \cdot 2SiO_2$) are also proposed. For example, U.S. Pat. No. 5,561,089 disclosed a glass-ceramic having a main crystal phase of gahnite. The degree of surface roughness of the polished glass-ceramic is within a range of from 0.5 to 9.0 Angstroms. U.S. Pat. No. 5,726,108 disclosed a glass-ceramic containing at least one selected from the group consisting of mullite and aluminum borate as its main crystal phases. Japanese Patent application Laid-open No. 2000-169184 and 2000-169186 disclosed in their abstracts a glass-ceramic for substrate of magnetic disk having enstatite and/or beta-quartz solid solution as the predominant crystal phases. But all the glass-ceramics proposed in these prior art documents are either poor in the mechanical property or need high processing temperature (such as melting temperature, clarifying temperature, nucleation and crystallization temperature) in order to produce these glass-ceramics. There still exist a need for a glass-ceramic suitable for use as substrate of magnetic disk having higher strength and which can be fabricated by a relative economic process.

SUMMARY OF THE INVENTION

An object of the present invention is to eliminate various disadvantages involved in the above described prior art, and to provide a novel glass-ceramic with much improved bending strength that can be polished to a surface roughness of 10 Angstroms or less. Furthermore, the glass-ceramic of present invention can be fabricated with a reduced cost and is suitable for use as substrate of magnetic disks. Another object of the present invention is to provide a process for producing the glass-ceramic and a substrate of magnetic disk made of the glass-ceramic.

In one aspect, the present invention provides a glass-ceramic for substrate of magnetic disk having high strength, wherein the glass-ceramic is of $Li_2O$—$SiO_2$—$P_2O_5$—$Y_2O_3$ system glass-ceramic and can be obtained by subjecting to heat treatment a base glass which consists essentially of in weight percent: from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$, and the glass-ceramic comprises $Li_2O \cdot 2SiO_2$ as the main crystal phase.

According to a preferred embodiment of the invention, the crystal phase of the glass-ceramic of the invention is composed of spherical grains or aggregated spherical grains, and the size of the spherical grains or aggregated spherical grains is controlled to the range from 0.1–1.0 micron by heat treatment.

According to a further preferred embodiment of the invention, the glass-ceramic of the invention has been subjected to a lapping and finally polishing process which produces a surface roughness (Ra) of less than 10 Angstroms.

According to another preferred embodiment of the invention, the glass-ceramic of the invention has a bending strength between 230 and 360 MPa measured in accordance with the National Standards for Testing Ceramic Materials of China (GB6569-86).

In another aspect, the present invention provide a economic process for producing the glass-ceramic for substrate of magnetic disk having high strength, comprising the steps of:

(a) Melting at a temperature within a range from 1300° C. to 1370° C. the base glass of the glass-ceramic with a composition of, in terms of weight percent of their oxides, from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$;

(b) Clarifying the glass composition at a temperature within a range from 1350° C. to 1450° C.;

(c) Forming the molten glass into a desired shape;

(d) Heating the glass at a nucleation temperature within a range from 460° C. to 560° C. for 1 to 10 hours;

(e) Heating the glass at a crystallization temperature within a range from 580° C. to 750° C. for 0.5 to 10 hours.

The base glass of the present glass-ceramic may further comprise, in terms of weight percent of their oxides, from 0 to 5.0% of $La_2O_3$, from 0 to 3.0% of $TiO_2$, from 0 to 3.0% of $ZrO_2$, from 0 to 3.0% of $SnO_2$, from 0 to 3.0% of MgO and from 0 to 2.0% of ZnO.

According to another preferred embodiment of the invention, the process for producing the glass-ceramic of the invention may further include a step (f): lapping and finally polishing the glass-ceramic to produce a surface roughness of less than 10 Angstroms.

In another aspect, the invention provides a substrate of magnetic disk having high strength made of a glass-ceramic, wherein the glass-ceramic is of $Li_2O$—$SiO_2$—$P_2O_5$—$Y_2O_3$ system glass-ceramic and can be obtained by subjecting to heat treatment a base glass which consists essentially of in weight percent: from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$, and the glass-ceramic comprises $Li_2O \cdot 2SiO_2$ as the main crystal phase. Preferably, the substrate has a surface roughness of less than 10 Angstroms and a bending strength between 230 and 360 MPa measured in accordance with the National Standards for Testing Ceramic Materials of China (GB6569-86).

DETAILED DESCRIPTION OF THE INVENTION

The present invention consists in that the base glass of the glass-ceramic precludes $K_2O$ and comprises $Y_2O_3$ and $Al_2O_3$ as indispensable components such that the composition of the base glass comprises, in terms of weight percent of their oxides, from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$. The present glass-ceramic can be obtained by melting the base glass composition at a temperature within a range from 1300° C. to 1370° C. and subsequently clarifying the glass composition at a temperature within a range from 1350° C. to 1450° C.; forming the molten glass into a desired shape; heating the glass at a nucleation temperature within a range from 460° C. to 560° C. for 1 to 10 hours; and then heating the glass at a crystallization temperature within a range from 580° C. to 750° C. for 0.5 to 10 hours.

The resulting glass-ceramic after heat-treatment is of $Li_2O$—$SiO_2$—$P_2O_5$—$Y_2O_3$ system glass-ceramics and comprises $Li_2O \cdot 2SiO_2$ as the main crystal phase. Preferably, the crystal of the glass-ceramic is composed of spherical grains or aggregated spherical grains, and the size of the spherical grains or aggregated spherical grains is controlled to a range of from 0.1 to 1.0 micron by heat treatment, and the glass-ceramic has a bending strength between 230 and 360 Mpa measured in accordance with the National Standard for Testing Ceramic Materials of China (GB6569-86). Preferably, the glass-ceramic of the invention has a surface roughness less than 10 Angstroms after lapping and finally polishing process which is conventionally used in producing the substrate of magnetic disk.

In spite of not wishing to be bound to specific theory, it is believed that introduction of $Y_2O_3$ into the glass composition of the present invention while precluding the presence of $K_2O$ can producing the following advantages: (1) increasing the bending strength and elastic modulus of the glass-ceramic, (2) increasing the content of $Li_2O$ and the content of the main crystal phase lithium disilicate ($Li_2O \cdot 2SiO_2$) as well, (3) lowering the melting temperature or the clarifying temperature by 50° C. to 100° C. relative to that of a glass-ceramic of a similar type. As a result, the melting temperature of present glass-ceramic is within a range from 1300° C. to 1370° C. and clarifying temperature thereof is within a range from 1350° C. to 1450° C., all of these contribute to reduce the energy consumption for the production of the glass-ceramic, and to further lower the demand to the production equipments, and consequently the glass-ceramic substrate for magnetic disk can be provided with a competitive price.

$SiO_2$ is an essential component for the glass-ceramic to obtain a main crystal phase of $Li_2O \cdot 2SiO_2$ by heat-treatment. If the content of $SiO_2$ is less than 65.0%, crystals are precipitated in the glass in uncontrolled manner such that a high quality of surface roughness can't be obtained; while if its content is more than 80.0%, it is very much difficult to melt the base glass.

$Li_2O$ is also an essential component for the glass-ceramic to obtain a main crystal phase of $Li_2O \cdot 2SiO_2$ by heat-treatment. If the content of $Li_2O$ is less than 13.0%, it is very easy to crystallize the glass and a higher temperature will be necessary to melt the glass composition which give rise to an increased production cost; while if its content is more than 19.0%, the chemical stability and hardness of the resulting glass-ceramic is adversely lowered and the crystallization process can not be controlled with ease.

$Al_2O_3$ is an essential component to improve the chemical stability of the present glass-ceramic. If the content of $Al_2O_3$ is less than 0.5%, the chemical stability of the glass-ceramic is deteriorated; while if its content is more than 5.0%, the glass may crystallize uncontrollably during the heat-treatment process whereby giving very coarse grains, and a desired quality of surface roughness can not be obtained.

$P_2O_5$ is also indispensable to serve as nucleation agent. If the content of $P_2O_5$ is less than 1.0%, the base glass is crystallized to give only a fewer number of coarse grains, whereby a desired quality of surface roughness can not be obtained; while if its content is more than 7.0%, the glass is tend to be devitrified during forming. As a result, the glass may crystallize uncontrollably during the subsequent heat-treatment processes.

$Y_2O_3$ is an indispensable component to improve the properties of the present glass-ceramic. If the content of $Y_2O_3$ is less than 0.5%, the beneficial effect thereof is not sufficient, and the crystallization process cannot be controlled with ease; while if its content is more than 10.0%, the glass is crystallized to give coarse grains, whereby a desired quality of surface roughness can not be obtained and the cost of raw materials is undesirably raised.

$Sb_2O_3$ and/or $As_2O_3$ are also indispensable to serve as clarifying agent. In this connection, the contents of at least one selected from $Sb_2O_3$ and $As_2O_3$ should be within a range form 0.2 to 2.0%.

In an alternative embodiment of the present invention, the glass composition further contains, in terms of weight percent of their oxides, from 0 to 5.0% of $La_2O_3$, from 0 to 3.0% of $TiO_2$, from 0 to 3.0% of $ZrO_2$, from 0 to 3.0% of $SnO_2$, from 0 to 3.0% of MgO and from 0 to 2.0% of ZnO, provided that the desired properties of the glass-ceramic are not impaired.

In the process for producing the glass-ceramic according to the invention, base glass of the glass-ceramic is melted at a temperature within a range from 1300° C. to 1370° C. and its clarifying temperature falls within a range from 1350° C. to 1450° C., wherein the melting temperature is 50° C. to 100° C. lower than that of a glass-ceramic of a similar type. The glass can be heated to produce a crystal nucleus at a nucleation temperature within a range from 460° C. to 560° C. for 1 to 10 hours and further heating for crystallization can be effected at a crystallization temperature within a range from 580° C. to 750° C. for 0.5 to 10 hours.

The advantages of the present glass-ceramic and process thereof compared with the prior art glass-ceramic of same system and its production process will be more apparent to a person skilled in the art by referring to the following examples and comparative examples.

EXAMPLES

Example 1

The composition of base glass comprises the following components, expressed in weight, $SiO_2$: 69.8%, $Li_2O$: 16.6%, $Al_2O_3$: 2.0%, $Y_2O_3$: 7.4%, $P_2O_5$: 3.0%, $Sb_2O_3$: 0.5%, $SnO_2$: 0.7%. The glass-ceramic can be prepared by first formulating into a mixture the raw materials that can be provided in the form of their oxides, carbonates, or nitrates; and melting the raw material mixture by a conventional glass melting device at a temperature within a range from 1300° C. to 1370° C. and clarifying the glass composition at a temperature within a range from 1350° C. to 1450° C.; subsequent to homogenizing and processing the composition into a desired shape, the base glass can be heat-treated to obtain the desired of $Li_2O—SiO_2—P_2O_5—Y_2O_3$ system glass-ceramic with a condition of heating at a nucleation temperature 505° C. for 5 hours and at a crystallization temperature 720° C. for 2 hours. The resulted glass-ceramic comprises $Li_2O \cdot 2SiO_2$ as the main crystal phase with a grain size of 1.0 micron, and the glass-ceramic has a bending strength of 297 MPa and has a surface roughness of 9 Angstroms after lapping and finally polishing process which is conventionally used in producing substrate for magnetic disk. The grain size is determined by SEM observation, the bending strength is measured according to National Standards for Testing Ceramic Materials of China GB-6596-86 and the main crystal phase is characterized by XRD.

Example 2

A glass-ceramic is produced according to the process of example 1, except that the base glass has a composition of expressed in weight, $SiO_2$: 67.8%, $Li_2O$: 15.8%, $Al_2O_3$: 2.7%, $Y_2O_3$: 9.0%, $P_2O_5$: 3.0%, $As_2O_3$: 0.5%, 0.5%, $TiO_2$: 0.2%, $ZrO_2$: 0.2%, $SnO_2$: 0.1%, MgO: 0.2%, ZnO: 0.1%, and the heat-treatment conditions comprise first nucleating at a temperature of 520° C. for 3 hours and then further crystallizing the glass at a temperature 680° C. for 1 hours. The resulted glass-ceramic comprises $Li_2O \cdot 2SiO_2$ as the main crystal phase with a grain size of 1.0 micron, and the glass-ceramic has a bending strength of 255 MPa and a surface roughness of 9 Angstrom after polishing.

Example 3

A glass-ceramic is produced according to the process of example 1, except that the base glass has a composition of expressed in weight, $SiO_2$: 69.6%, $Li_2O$: 14.2%, $Al_2O_3$: 4.1%, $Y_2O_3$: 3.3%, $P_2O_5$: 4.3%, $Sb_2O_3$: 0.8%, MgO: 2.0%, $ZrO_2$: 0.5%, and the heat-treatment conditions comprise first nucleating at a temperature of 510° C. for 4 hours and then further crystallizing the glass at a temperature 640° C. for 3 hours. The resulted glass-ceramic comprises $Li_2O \cdot 2SiO_2$ as the main crystal phase with a grain size of 0.3 micron, and the glass-ceramic has a bending strength of 243 MPa and a surface roughness of 6 Angstrom after polishing.

Example 4

A glass-ceramic is produced according to process of example 1, except that the base glass has a composition of expressed in weight, $SiO_2$: 70.8%, $Li_2O$: 15.7%, $Al_2O_3$: 2.7%, $Y_2O_3$: 4.0%, $P_2O_5$: 6.0%, $Sb_2O_3$: 0.5%, and the heat-treatment conditions comprise first nucleating at a temperature of 480° C. for 6 hours and then further crystallizing the glass at a temperature 620° C. for 2 hours. The resulted glass-ceramic comprises $Li_2O \cdot 2SiO_2$ as the main crystal phase with a grain size of 0.3 micron, and the glass-ceramic has a bending strength of 231 MPa and a surface roughness of 3 Angstrom after polishing.

Example 5

A glass-ceramic is produced according to process of example 1, except that the base glass has a composition of expressed in weight, $SiO_2$: 75.2%, $Li_2O$: 13.0%, $Al_2O_3$: 2.5%, $Y_2O_3$: 6.7%, $P_2O_5$: 2.5%, $Sb_2O_3$: 1.0%, $As_2O_3$: 0.5%, and the heat-treatment conditions comprise first nucleating at a temperature of 540° C. for 2 hours and then further crystallizing the glass at a temperature 700° C. for 5 hours. The resulted glass-ceramic comprises $Li_2O \cdot 2SiO_2$ as the main crystal phase with a grain size of 0.8 micron, and the glass-ceramic has a bending strength of 286 MPa and a surface roughness of 8 Angstrom after polishing.

Example 6

A glass-ceramic is produced according to process of example 1, except that the base glass has a composition of expressed in weight, $SiO_2$: 73.8%, $Li_2O$: 16.9%, $Al_2O_3$: 2.1%, $Y_2O_3$: 1.5%, $P_2O_5$: 3.9%, $Sb_2O_3$: 0.8%, $La_2O_3$: 1.0%, and the heat-treatment conditions comprise first nucleating at a temperature of 500° C. for 3 hours and then further crystallizing the glass at a temperature 650° C. for 7 hours. The resulted glass-ceramic comprises $Li_2O \cdot 2SiO_2$ as the main crystal phase with a grain size of 0.5 micron, and the glass-ceramic has a bending strength of 226 Mpa and a surface roughness of 4 Angstrom after polishing.

Comparative Example 1

A glass-ceramic is produced by subjecting to heat treatment a base glass having the composition of expressed in weight, $SiO_2$: 78.0%, $Li_2O$: 11%, $Al_2O_3$: 2.0%, $K_2O$: 2.0%, $P_2O_5$: 3.0%, $Sb_2O_3$: 0.5%, MgO: 2.0%, $ZrO_2$: 1.0%, $SnO_2$: 0.5%, and the heat-treatment conditions comprise first nucleating at a temperature of 480° C. for 5 hours and then further crystallizing the glass at a temperature 750° C. for 2 hours. The resulted glass-ceramic comprises $Li_2O \cdot 2SiO_2$ and alpha-cristobalite as the main crystal phases with a grain size of 0.3 micron, and the glass-ceramic has a bending strength of 204 MPa and a surface roughness of 3 Angstrom after polishing.

Comparative Example 2

A glass-ceramic is produced by subjecting to heat treatment a base glass having a composition of expressed in weight, $SiO_2$: 78.0%, $Li_2O$: 19.8%, $Al_2O_3$: 0.5%, $Na_2O$+$K_2O$: 1.0%, $P_2O_5$: 0.2%, $Sb_2O_3$: 0.5%, and the resulte glass-ceramic comprises $Li_2O \cdot 2SiO_2$ as the main crystal phase with a grain size of 3.0 micron, and the glass-ceramic has a bending strength of 130 MPa and a surface roughness of 25 Angstrom after polishing.

As can be seen from the results of examples and comparative examples, the glass-ceramic according to the present invention is greatly improved in relations to bending strength, grain size, etc. The samples fabricated can be polished to a surface roughness of less than 10 Angstroms, and are especially suitable for use as substrate of magnetic disks.

What is claimed is:

1. A glass-ceramic for substrate of magnetic disk having high strength, wherein the glass-ceramic is of $Li_2O$—$SiO_2$—$P_2O_5$—$Y_2O_3$ system glass-ceramic and can be obtained by subjecting to heat treatment a base glass which consists essentially of in weight percent: from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$, and the glass-ceramic comprises $Li_2O \cdot 2SiO_2$ as the main crystal phase.

2. The glass-ceramic for substrate of magnetic disk having high strength as defined in claim 1, wherein the base glass further comprises in weight percent: from 0 to 5.0% of $La_2O_3$, from 0 to 3.0% of $TiO_2$, from 0 to 3.0% of $ZrO_2$, from 0 to 3.0% of $SnO_2$, from 0 to 3.0% of MgO and from 0 to 2.0% of ZnO.

3. The glass-ceramic for substrate of magnetic disk having high strength as defined in claim 1, wherein the crystal phase of the glass-ceramic is composed of spherical grains or aggregated spherical grains, and the size of the spherical grains or aggregated spherical grains is controlled to the range from 0.1 to 1.0 micron by heat treatment.

4. The glass-ceramic for substrate of magnetic disk having high strength as defined in claim 1, wherein said glass-ceramic has been subjected to a lapping and final polishing process which produces a surface roughness (Ra) of less than 10 Angstroms.

5. The glass-ceramic for substrate of magnetic disk having high strength as defined in claim 1, wherein the glass-ceramic has a bending strength between 230 and 360 MPa.

6. A process for producing the glass-ceramic for substrate of magnetic disk having high strength according to claim 1, comprising the steps of:
    (a) Melting at a temperature within a range from 1300° C. to 1370° C. a base glass of the glass-ceramic having a composition of, in terms of weight percent of their oxides, from 65% to 80.0% of $SiO_2$, from 0.5% to 5.0% of $Al_2O_3$, from 13.0% to 19.0% of $Li_2O$, from 1.0% to 7.0% of $P_2O_5$, from 0.5% to 10.0% of $Y_2O_3$ and from 0.2% to 2.0% of at least one of $Sb_2O_3$ and $As_2O_3$;
    (b) Clarifying the glass composition at a temperature within a range from 1350° C. to 1450°C.
    (c) Forming the molten glass into a desired shape;
    (d) Heating the glass at a nucleation temperature within a range from 460° C. to 560° C. for 1 to 10 hours;
    (e) Heating the glass at a crystallization temperature within a range from 580° C. to 750° C. for 0.5 to 10 hours.

7. The process as defined in claim 6, wherein the base glass further comprises in weight percent: from 0 to 5.0% of $La_2O_3$, from 0 to 3.0% of $TiO_2$, from 0 to 3.0% of $ZrO_2$, from 0 to 3.0% of $SnO_2$, from 0 to 3.0% of MgO and from 0 to 2.0% of ZnO.

8. The process as defined in claim 5, further comprises the step (f): lapping and final polishing the glass-ceramic to produce a surface roughness of less than 10 Angstroms.

* * * * *